US011535529B2

(12) United States Patent
Sieth et al.

(10) Patent No.: US 11,535,529 B2
(45) Date of Patent: Dec. 27, 2022

(54) WATER FAUCET INCORPORATING DISINFECTING FEATURES

(71) Applicants: A. O. SMITH CORPORATION, Milwaukee, WI (US); Kenneth J. Sieth, Delafield, WI (US); Chen Li, Menomonee Falls, WI (US)

(72) Inventors: Kenneth J. Sieth, Delafield, WI (US); Chen Li, Menomonee Falls, WI (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 16/646,451

(22) PCT Filed: Sep. 10, 2018

(86) PCT No.: PCT/US2018/050266
§ 371 (c)(1),
(2) Date: Mar. 11, 2020

(87) PCT Pub. No.: WO2019/055348
PCT Pub. Date: Mar. 21, 2019

(65) Prior Publication Data
US 2020/0290893 A1    Sep. 17, 2020

Related U.S. Application Data

(60) Provisional application No. 62/557,484, filed on Sep. 12, 2017.

(51) Int. Cl.
*C02F 1/32* (2006.01)
*C02F 1/44* (2006.01)
*E03C 1/04* (2006.01)

(52) U.S. Cl.
CPC .............. *C02F 1/325* (2013.01); *C02F 1/444* (2013.01); *E03C 1/0404* (2013.01);
(Continued)

(58) Field of Classification Search
CPC ...... C02F 1/72; C02F 1/78; C02F 1/48; C02F 1/46; A61L 2/10; B01D 32/34; B01D 61/10; B01D 61/08
See application file for complete search history.

(56) References Cited

U.S. PATENT DOCUMENTS 2,008,016 A * 7/1935 Hamilton ................ A24F 27/10
206/125
7,270,748 B1   9/2007 Lieggi
(Continued)

FOREIGN PATENT DOCUMENTS

CN        106145477 A      11/2016
CN        106517410 A  *    3/2017
(Continued)

OTHER PUBLICATIONS

International Search Report and Written Opinion for Application No. PCT/US2018/050266 dated Nov. 26, 2018 (11 pages).
(Continued)

*Primary Examiner* — Cameron J Allen
(74) *Attorney, Agent, or Firm* — Michael Best & Friedrich LLP

(57) ABSTRACT

A water dispensing unit adapted for communication with a water supply includes a spout configured to receive water from the water supply and dispense the water to a receptacle for consumption. The water supply includes water received from a municipal water supply and contained within a space directly upstream of a base of the spout. A flow of water from the water supply and into the spout via the base is a downstream water flow. A disinfecting mechanism operable to disinfect water in at least one of the spout or a space immediately upstream of the spout.

17 Claims, 12 Drawing Sheets

(52) U.S. Cl.
CPC ............... *C02F 2201/3222* (2013.01); *C02F 2201/3223* (2013.01); *C02F 2201/3228* (2013.01); *C02F 2303/04* (2013.01); *C02F 2307/06* (2013.01); *C02F 2307/10* (2013.01)

(56) References Cited

U.S. PATENT DOCUMENTS

| | | | |
|---|---|---|---|
| 7,566,885 | B2 | 7/2009 | Helmore et al. |
| 8,421,032 | B2 | 4/2013 | Dornseifer |
| 9,630,856 | B2 | 4/2017 | Loniewski et al. |
| 10,077,194 | B2 | 9/2018 | Knight et al. |
| 10,137,213 | B2 | 11/2018 | St. Louis et al. |
| 2006/0175270 | A1 | 8/2006 | Greene |
| 2008/0169249 | A1 | 7/2008 | Ter Stege |
| 2011/0160333 | A1* | 6/2011 | Lisec ..................... C09D 7/70 523/122 |
| 2012/0138545 | A1 | 6/2012 | Soler et al. |
| 2015/0008167 | A1 | 1/2015 | Shturm et al. |
| 2015/0251921 | A1* | 9/2015 | Sobanski ................ A61L 2/10 210/748.12 |
| 2016/0214041 | A1* | 7/2016 | Miller ..................... E03C 1/055 |
| 2016/0331855 | A1* | 11/2016 | St. Louis ............... A61C 1/052 |

FOREIGN PATENT DOCUMENTS

| | | | |
|---|---|---|---|
| DE | 4318096 A1 * | 6/1994 | ............ C02F 1/325 |
| DE | 4318096 A1 | 6/1994 | |
| DE | 102005006011 B3 | 10/2006 | |
| WO | WO-9950183 A1 * | 10/1999 | ............ C02F 1/325 |
| WO | WO-3076044 A1 * | 3/2003 | ............ C02F 1/325 |
| WO | 2017140790 A1 | 8/2017 | |

OTHER PUBLICATIONS

International Preliminary Report on Patentability for Application No. PCT/US2018/050266 dated Mar. 26, 2020 (7 pages).
Chinese Patent Office Action for Application No. 201880070830.8 dated Dec. 16, 2021 (22 pages, including English translation).
India Patent Office Examination Report for Application No. 202017009215 dated Jul. 20, 2021 (5 pages).
European Patent Office Extended Search Report for Application No. 18855383.8 dated Apr. 9, 2021 (9 pages).

* cited by examiner

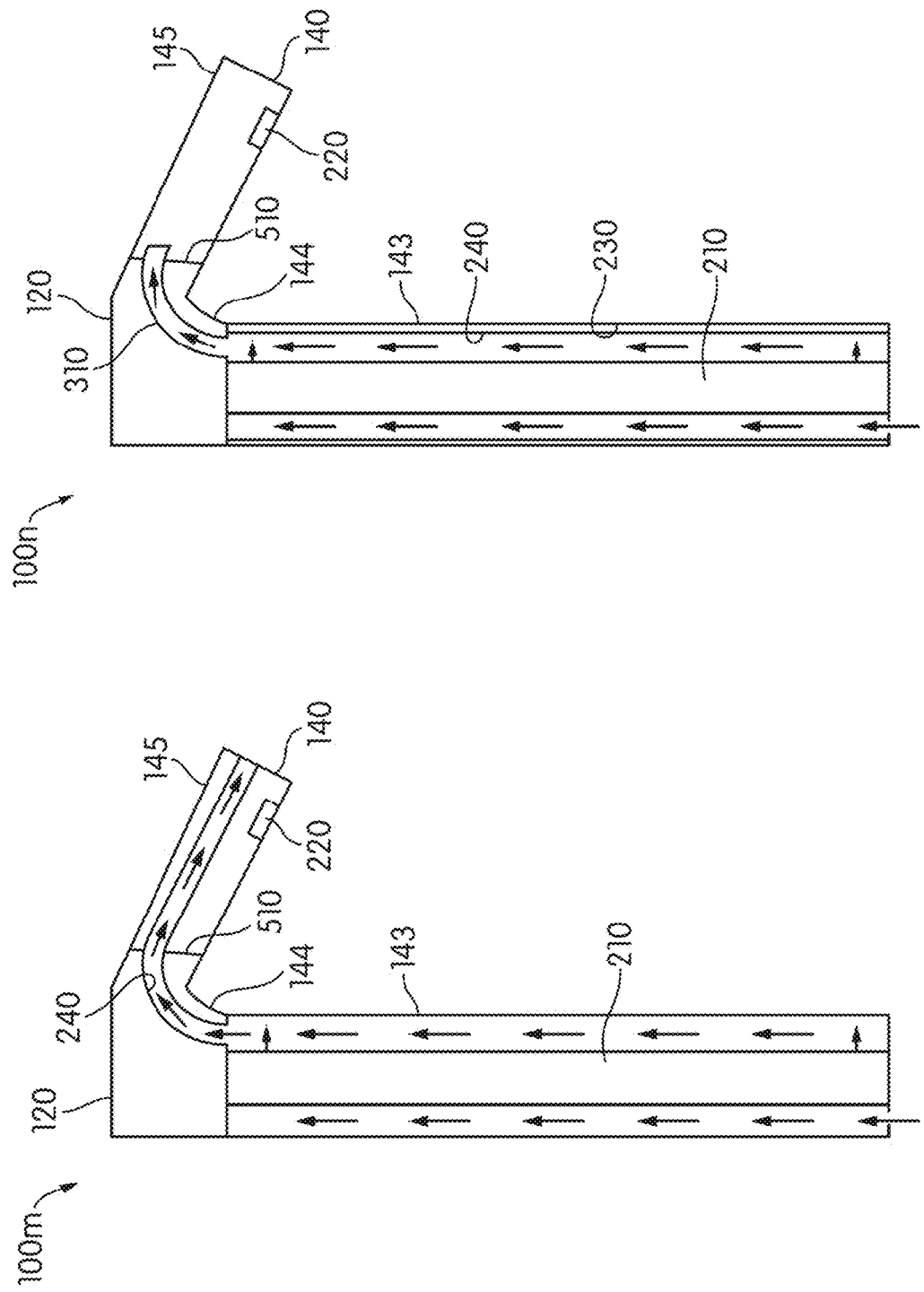

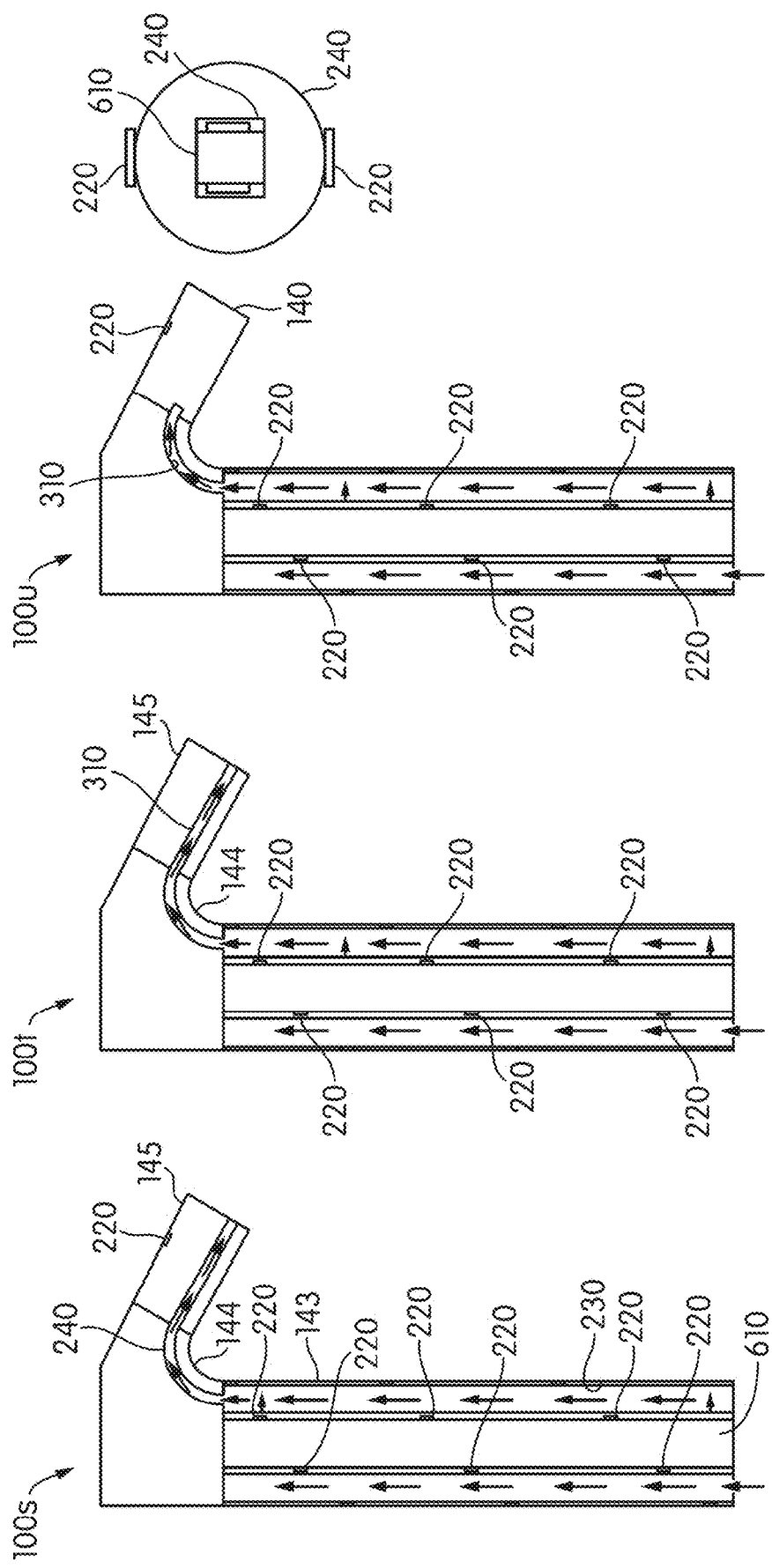

WATER FAUCET INCORPORATING DISINFECTING FEATURES

BACKGROUND

Microbiological secondary contamination after reverse osmosis treatment is an industry-wide problem. Bacteria will grow exponentially in the storage tank, post carbon filter, fittings, tubing and faucet during idle time. One of the current solutions is to put a small UV lamp after reverse osmosis. However, such UV lamps cannot remove nutrients that support bacteria regrowth. Consequently, bacteria will regrow in the pipe line and faucet after UV treatment. Another unaddressed source of bacteria growth and regrowth is caused by bacteria from the air or other items that come into contact with the faucet tip, entering the tip, and forming a biofilm.

SUMMARY

The present invention relates to incorporating bacteria killing features in one or more of the following areas of a water faucet: upstream of the faucet, within the main body of the faucet, and at the outlet or point of dispense of the faucet. Another optional feature of the present invention is to potentially extend the life of a UV lamp compared to known systems. Another feature of the present invention is to inhibit bacteria regrowth during stagnation periods between water draws.

In one aspect, the disclosure provides a water dispensing unit adapted for communication with a water supply, the water dispensing unit including a spout configured to receive water from the water supply and dispense the water to a receptacle for consumption, wherein the water supply includes water received from a municipal water supply and contained within a space directly upstream of a base of the spout, wherein a flow of water from the water supply and into the spout via the base is a downstream water flow, and a disinfecting mechanism operable to disinfect water in at least one of the spout or a space immediately upstream of the spout.

In another aspect, the disclosure provides a method of using a point-of-use water dispensing unit adapted for communication with a water supply, the method including providing a spout configured to receive water from the water supply at a base, wherein a flow of water from the water supply and into the spout via the base is a downstream water flow, and wherein the water supply includes water received from a municipal water supply and contained within a space directly upstream of the base, disinfecting water from the water supply in at least one of the spout or a space immediately upstream of the spout via a disinfecting mechanism, and dispensing the water to a receptacle via the spout.

Other aspects of the invention will become apparent by consideration of the detailed description and accompanying drawings.

BRIEF DESCRIPTION OF THE DRAWINGS

FIG. 13 illustrates a thirteenth construction of a faucet according to the present invention.

FIG. 14 illustrates a fourteenth construction of a faucet according to the present invention.

FIG. 19 illustrates a nineteenth construction of a faucet according to the present invention.

FIG. 20 illustrates a twentieth construction of a faucet according to the present invention.

FIG. 21 illustrates a twenty-first construction of a faucet according to the present invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
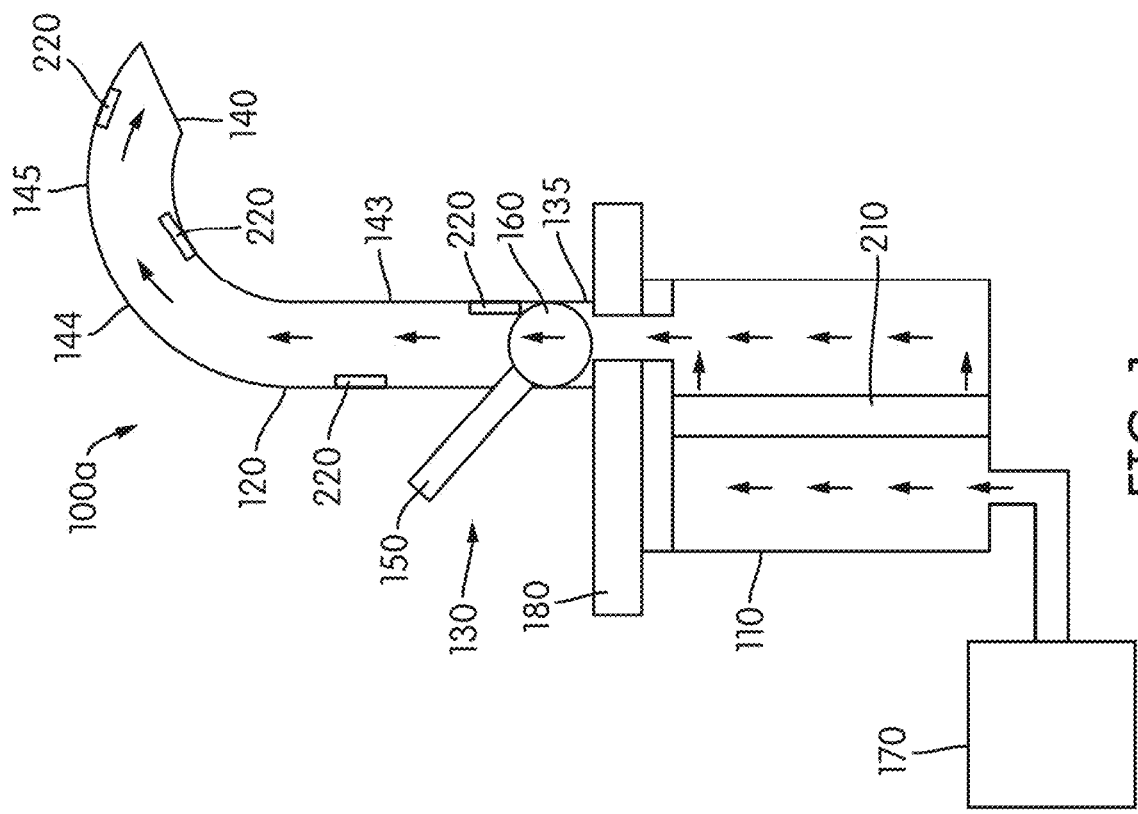
FIG. 1 illustrates a first construction of a faucet according to the present invention.

FIG. 1 illustrates a point-of-use faucet assembly 100a including a water supply 110, a spout 120, and a valve assembly 130. The spout 120 receives water from the water supply 110 at a base 135 and dispenses the water at a tip 140. Although the base 135 is illustrated as being at the lowermost end of the spout 120 it may in other embodiments not be the lowermost end, and in this regard, the term "base" should be construed as the inlet end of the spout 120 and not as a spatial limitation. The illustrated spout 120 includes a vertical rise 143, a curved portion 144 which turns the water flow from vertical to non-vertical, and a dispensing portion 145 which includes the tip 140. The valve assembly 130 includes a handle 150 and a valve 160. The handle 150 is manipulated by a consumer to actuate the valve 160 to permit and restrict the flow of water through the spout 120.

The faucet assembly 100a may more generally be referred to as a water dispensing unit. The water supply 110 delivers water to the spout 120 either directly from a municipal supply or from a filtration unit 170 such as a reverse osmosis system or carbon filter, and may therefore be characterized as downstream from the filtration unit 170, and/or a municipal supply, and upstream of the spout 120. A flow of water from the water supply 110 and into the spout 120 via the base 135 is defined as being a downstream water flow. An upstream direction is defined as opposite the downstream water flow. More specifically, the water supply 110 may be characterized as water received from a municipal water supply, optionally purified or treated or filtered, and contained within a space directly upstream of the base 135 of the spout 120 (e.g., under a countertop 180 in the illustrated configuration). In one configuration, the spout 120 and water supply 110 communicate through a hole in the countertop 180. The illustrated faucet assembly 100a is illustrated schematically and conceptually; there is a very wide variety of faucet assemblies commercially available, all of which have the basic components schematically illustrated here. The drawings following FIG. 1 include the basic faucet assembly 100a components for environment, so some reference numbers are not repeated in those drawings.

The present invention applies various categories of disinfecting strategies to a faucet assembly. These categories of disinfecting strategies are generally referred to herein as: (i) pre-faucet disinfecting; (ii) in-faucet flow disinfecting; and (iii) in-faucet stagnation disinfecting. Pre-faucet disinfecting includes disinfecting water upstream of the faucet spout 120, such as in the water supply 110. In-faucet flow disinfection involves disinfecting flowing water inside the spout 120. In-faucet stagnation disinfection involves disinfecting standing or stagnating water inside the spout 120. These strategies will be discussed individually and in various combinations in more detail below with respect to the disclosed configurations.

The disinfecting strategies are implemented with a variety of apparatus in various combinations. The exemplary apparatus included in the disclosed configurations fall into several basic types: (i) ultraviolet (UV) disinfecting apparatus; (ii) antimicrobial apparatus; and (iii) filtering apparatus.

UV Disinfecting Apparatus

The UV disinfecting apparatus uses ultraviolet light to kill bacteria. Ultraviolet light has a wavelength in the range 310-100 nanometers (nm). These apparatuses may include, for example, one or more UV bulbs 210, one or more UV light-emitting diodes (LEDs) 220, and UV reflective structures 230. In constructions including UV reflective structures 230 that are not permitted to directly contact water, the apparatus may include UV transmissive structures 240 covering the UV reflective structures 230 as a physical barrier between the water and the UV reflective structures 230.

UV bulbs, also called UV lamps, may include, for example, a low pressure mercury lamp such as Philips TUV Mini 11 W lamp manufactured by Philips in Pila, Poland. A specialty low pressure mercury bulb may be used, whose shape is flexible and therefore can follow the bend of the faucet and extend to the faucet tip. UV bulb vendors like the Hanle Group are able to manufacture special shape UV bulbs. UV bulbs emit light in the ultraviolet wavelength range. The UV bulb may be controlled by an instant-start ballast or a preheat-start ballast. The UV bulb will typically warm up for 0.1 s to 1 s before the faucet assembly dispenses any water. The lamp life is typically measured by number of power on/off cycles referred to as switches. A printed circuit board (PCB) included in the system records the number of switches for the UV bulb. The system can include a controller that generates an alarm signal such as a sound or light or both, when the number of switches recorded by the PCB indicates that the UV bulb is reaching end-of-life and needs to be changed.

UV LEDs may be used as a primary or supplemental (i.e., in combination with a UV bulb) disinfection apparatus. The UV LEDs are mounted to a control chip and emit light in the ultraviolet wavelength range. The germicidal power of UV LEDs is solely determined by operating current. The UV LEDs are controlled separately from the UV lamp by a main PCB board or a different driver. The UV LEDs can be connected to the system power supply or alternatively operated on a backup battery and timer. With a battery and timer, stagnant water in the faucet can be disinfected when no consumer is present and main power is off. The supplemental disinfection duty cycle is determined by UV dosage and bacteria regrowth rate. In one configuration for a test environment, a cycle of 10 minutes on every 3 hours was proposed at 5 mW power level.

With reference to Table 1 below, the life of the UV LEDs is dictated by total running time instead of switching numbers. By running low power UV LEDs intermittently, the UV LED chip can have a 20 year lifetime and the mercury UV lamp life is extended due to a lower required duty cycle for bacteria regrowing inhibition. Current shall be adjusted to maintain required UV dosage.

TABLE 1

| Bacteria in tubing (cfu/ml) | Running time (min) | Germicidal power (mW) | After radiation (cfu/ml) | Disinfection Rate |
|---|---|---|---|---|
| 123000 | 1 | 20 | 770 | 99.4% |
|  | 5 |  | 0 | 100.0% |
|  | 1 | 5 | 29400 | 76.1% |
|  | 5 |  | 3 | 100.0% |

UV reflective structures may include, for example, PTFE, aluminum, or aluminum coated material, including for example aluminized steel, magnesium oxide, calcium carbonate or material containing these substances. Some UV reflective materials (e.g., aluminum) are of types not allowed by regulations or codes to be in direct contact with water. For such UV reflective materials, a layer of UV transmissive material may be layered over the top to keep the water from coming into contact with the UV transmissive layer. In such constructions, UV light passes through the protective UV transmissive layer, impinges on the UV reflective layer, and is reflected back through the UV transmissive layer. A protective layer of UV transmissive material is not required when the UV reflective material is of the type that is allowed to contact water (e.g., PTFE).

The UV reflective structure reflects UV light that impinges on the structure. The UV reflective material increases the effective UV power of the UV bulb by reflecting the UV light that would otherwise be directed away from the target (i.e., the water being disinfected) onto the target. The UV reflective material will therefore extend the useful life of a UV bulb as the intensity of the UV bulb drops due to aging. In one estimation, UV bulb life may be extended up to 8 to 10 years (40,000 to 60,000 switches) based on estimated one-year lamp life (5000 switches). In one example, the UV reflective structure is wrapped around the UV bulb and tubing covering the UV bulb. Through experiments, the inventors have shown that PTFE and aluminum foil can significantly enhance UV radiation delivered to the target to increase total UV dosage for a given period.

The UV transmissive structures may be, for example, tubing constructed of quartz, FEP, PCTFE, MFA or other fluoropolymers. Alternatively, a thin UV transmissive film, for example, PFA, acrylic or silicon, may be coated onto the UV reflective structures. In this regard, the term "UV transmissive structures" includes separate stand-alone elements having UV transmissivity and positioned adjacent the UV reflective structure as well as films or coatings having UV transmissivity and applied to the UV reflective structure. A UV transmissive structure permits light in the UV wavelength range to pass through it. The UV transmissive structures may be treated or coated with an antimicrobial coating, thereby serving the additional purpose of an antimicrobial apparatus.

Antimicrobial Apparatus

The second type of apparatus is an antimicrobial apparatus. The antimicrobial apparatus can include, for example, antimicrobial tubing 310 through which the water flows. Antimicrobial tubing includes a surface treatment on the water-facing surface (e.g., on the inside of the tube) which kills bacteria with which it comes into contact. One example of commercially-available antimicrobial tubing is Clearflo® Ag-47 antimicrobial tubing manufactured by NewAge Industries in Southampton, Pa. Although antimicrobial tubing is used in some of the disclosed constructions below, the invention also contemplates the use of any surface having an antimicrobial surface treatment, whether the surface is provided in the form of a tube, a channel or any other shape of surface. Where an antimicrobial surface is used as a primary disinfecting apparatus, as much of the water as possible should be brought into direct contact with the surface. Thus, when provided in the form of an antimicrobial tube, the tube inner diameter should be as small as possible for a given application to minimize the cross-sectional area of water that is not in direct contact with the tube inner walls. If an open channel with antimicrobial surface treatment or open antimicrobial surface is used to disinfect water, the layer of water flowing over the antimicrobial surface or surfaces should be as thin as possible for the application, to increase the likelihood that any bacteria in the water comes into contact with the antimicrobial surface.

Of course, UV disinfecting apparatus and antimicrobial apparatus can be used in various combinations to minimize bacteria regrowth. One possible design is to connect the UV transmissive tubing 240 with another piece of antimicrobial tubing 310 and put the UV-LED chip 220 at the faucet tip 140 to block any bacteria from the air. Alternatively, quartz or FEP or PCTFE or other fluoropolymer tubing with or without antimicrobial treatment can be extended to faucet tip 140. Reflective material 230 (e.g., PTFE or aluminum foil) can tightly cover a majority of the tubing, only leaving a light window for the UV-LED chip 220. The window is preferably sized to allow UV-LED light to shine through at the largest emitting angle at the edge. The outer reflective material 230 can spread the UV radiation through all covered tubing length. This design allows flexible faucet shape design. Alternatively if the reflective material 230 is used as faucet building material, or if the reflective material 230 (e.g., PTFE, aluminum) is attached to the faucet inner surface by coating, glue, or inserting a liner with a guiding part, the UV-LED 220 can be directly mounted on the material at the tip 140. The UV radiation of the UV LED 220 can still be spread throughout the length of the tubing 310. Another possible design is to place the UV-LED 220 at the worst regrowing spot which is usually the tubing/fitting turning point. To prevent regrowing from air, the faucet tip 140 may be shut off when system is not operating. The UV LED 220 can be positioned at an angle such that the light can shine through both the horizontal and vertical parts of the tubing 310. These and other configurations are described below with respect to the exemplary illustrated configurations.

Filtering Apparatus

The third type of apparatus mentioned above, filtering apparatus, operates by physically filtering bacteria out of water moving through a filter 410. The filter must permit water molecules to pass through while trapping bacteria. There are two primary types of filter material that are used in the exemplary constructions described below: microfiltration (MF) materials and ultrafiltration (UF) materials. MF filters have pore size of 0.1-10 micrometers (μm) while the pores of UF filters are 0.001-0.1 micrometers (μm). One example of commercially-available MF filter material is Para MF grade hollow fiber membrane manufactured by Para Membranes in Hwaseong, Korea. One example of commercially-available UF filter material is Para UF grade hollow fiber membrane manufactured by Para Membranes in Hwaseong, Korea. In the exemplary constructions described below, the MF and UF filtering materials are provided in the form of straws or a filter.

Exemplary Illustrated Constructions

FIG. 1 illustrates a faucet assembly 100a including a UV bulb 210 and UV LEDs 220. This construction implements the strategies of pre-faucet disinfecting with the UV bulb 210 in the water supply 110 upstream of the spout 120 and in-faucet stagnation disinfecting with the UV LEDs 220 throughout the spout 120, including at the tip 140.

Figure 2:
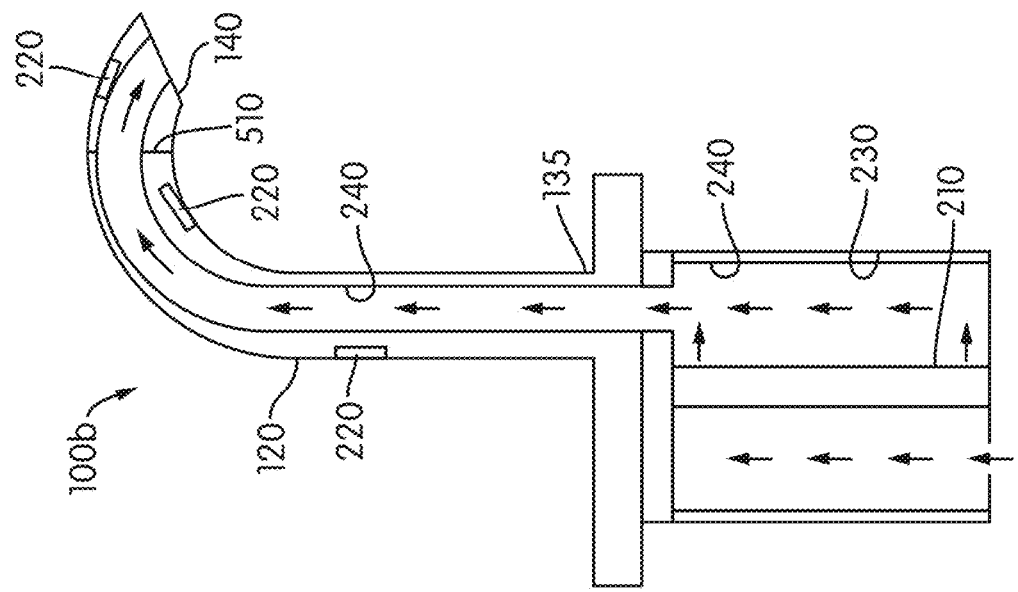
FIG. 2 illustrates a second construction of a faucet according to the present invention.

FIG. 2 illustrates a faucet assembly 100b including UV bulb 210, UV LEDs 220, UV reflective structures 230, and UV transmissive structures 240. This construction implements the strategy of pre-faucet disinfecting with the UV bulb 210 in the water supply 110 upstream of the spout 120 and the layer of UV reflective material 230 lining the water supply 110 to increase the UV radiation. In some embodiments, the UV transmissive material 240 may be layered on top of the UV reflective material 230 to prevent the water from coming into direct contact with the UV reflective material 230. This construction also implements in-faucet stagnation disinfecting with the UV LEDs 220 throughout the spout 120, including at the tip 140. In this construction, the UV transmissive material 240 in the form of a UV transmissive tube extends through the entire length of the spout 120 from the base 135 to the tip 140. The water flows through the UV transmissive tube 240 all the way to the tip 140 where the water is dispensed for consumption. During standby, the water sits or stagnates in the UV transmissive tube 240 while being irradiated with UV light from the UV LEDs 220. A guiding tool 510 holds the distal end (i.e., the free end near the spout tip 140) of the UV transmissive tube 240 in a desired position within the spout 120. The desired position may be, for example, centered or spaced from the spout 120 walls to maximize exposure to light from the UV LEDs. Although not illustrated, this construction may include a lining of UV reflective material 230 in the spout 120 to improve irradiation with the UV LEDs 220.

Figure 3:
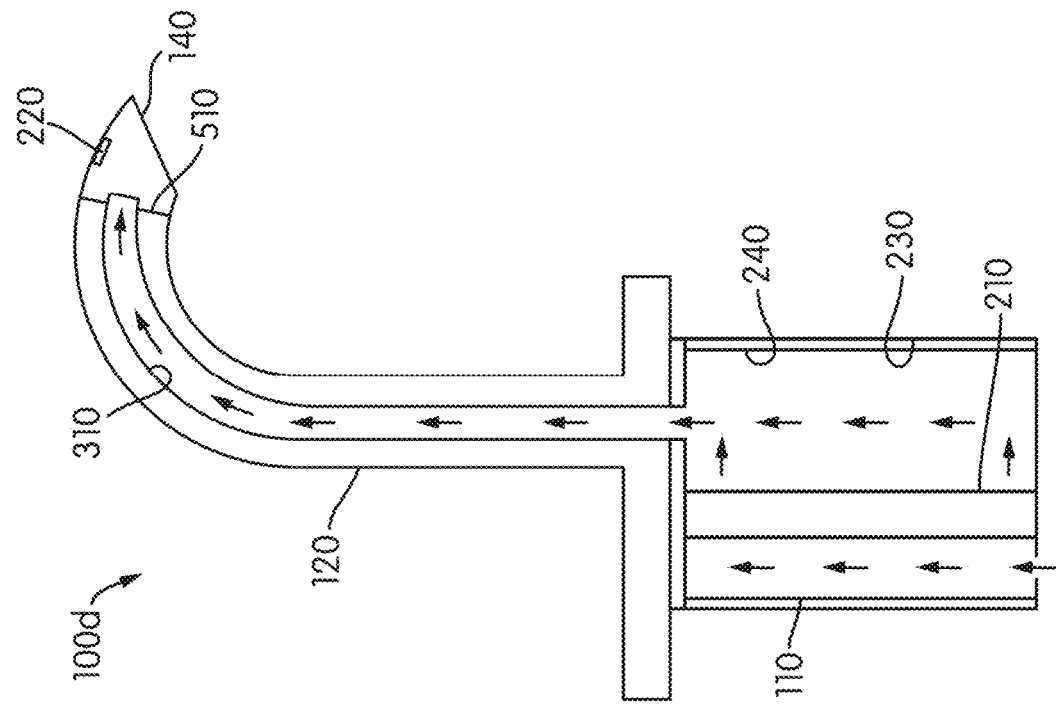
FIG. 3 illustrates a third construction of a faucet according to the present invention.

FIG. 3 illustrates a faucet assembly 100c implementing the same pre-faucet disinfecting strategy as in the faucet assembly 100b (FIG. 2) (i.e., UV bulb 210, UV reflective surface 230, and UV transmissive surface 240, if needed, in the water supply 110). This construction implements an alternative in-faucet stagnation disinfecting strategy, however, by providing antimicrobial tubing 310 to conduct water from the base 135 to the tip 140 of the spout 120. The antimicrobial tube 310 is supported by guiding tool 510. The water flows through the antimicrobial tubing 310 all the way to the tip 140 where the water is dispensed for consumption. During standby, the water sits or stagnates in the antimicrobial tubing 310 such that bacteria in the antimicrobial tubing 310 is killed by the antimicrobial material forming the antimicrobial tube 310.

Figure 4:
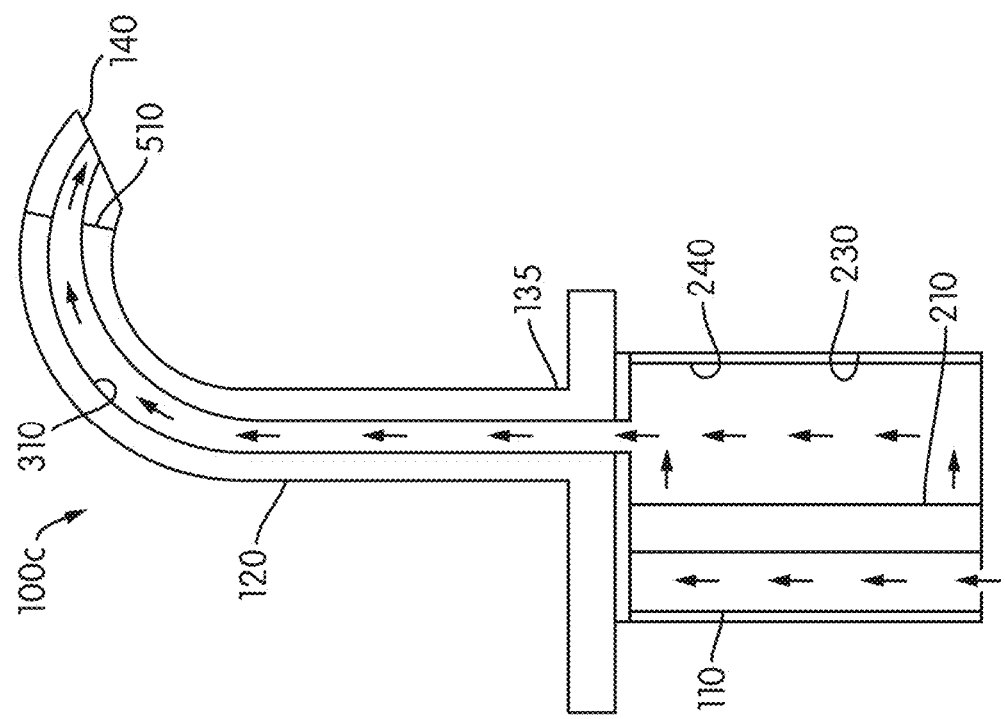
FIG. 4 illustrates a fourth construction of a faucet according to the present invention.

FIG. 4 illustrates a faucet assembly 100d implementing the same pre-faucet disinfecting strategy as in the faucet assembly 100c (FIG. 3) (i.e., UV bulb 210, UV reflective surface 230, and UV transmissive surface 240, if needed, in the water supply 110). This construction implements an alternative in-faucet stagnation disinfecting strategy, in which the antimicrobial tubing 310 does not extend all the way to the tip 140 of the spout 120. The distal end of the antimicrobial tube 310 is supported by a guiding tool 510. In the zone between the end of the antimicrobial tubing 310 and the tip 140 of the spout 120, one or more UV LEDs 220 are positioned to kill bacteria in any water that stagnates there.

Figure 5:
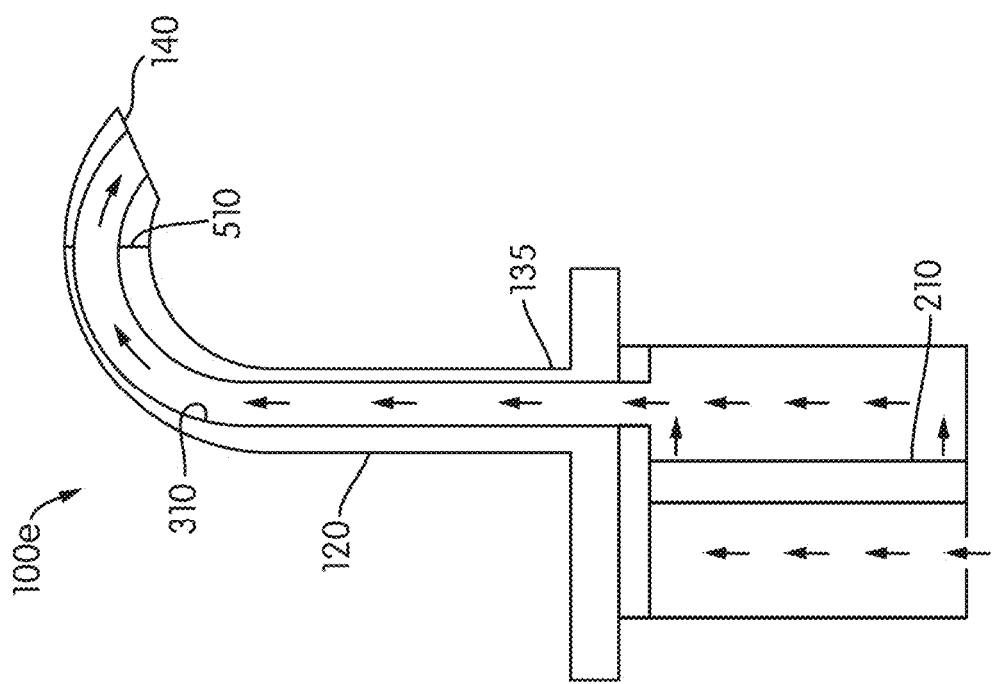
FIG. 5 illustrates a fifth construction of a faucet according to the present invention.

FIG. 5 illustrates a faucet assembly 100e substantially the same as the faucet assembly 100c (FIG. 3), but without the UV reflective surface 230 or UV transmissive surface 240 in the water supply 110. This construction implements a pre-faucet disinfecting strategy that includes the UV bulb 210. This construction implements the same in-faucet stagnation disinfecting strategy as in the faucet assembly 100c (FIG. 3) (i.e., antimicrobial tube 310 extending the entire length of the spout 120 from the base 135 to the tip 140). During standby, the water sits or stagnates in the antimicrobial tubing 310 such that bacteria in the antimicrobial tubing 310 is killed by the antimicrobial material 310. The antimicrobial tube 310 is supported by a guiding tool 510.

Figure 6:
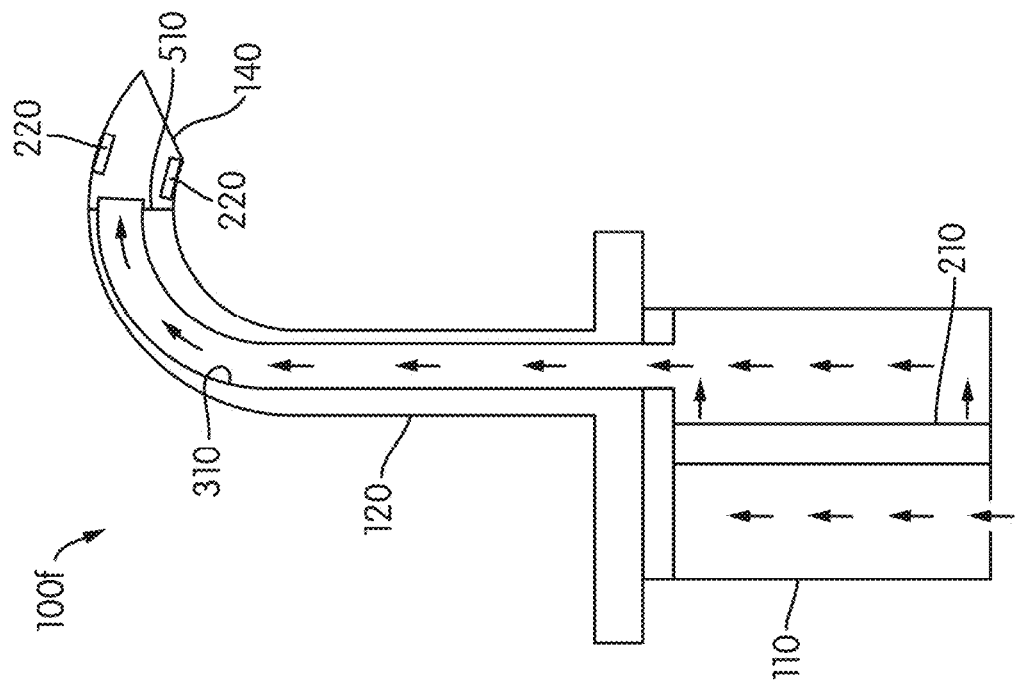
FIG. 6 illustrates a sixth construction of a faucet according to the present invention.

FIG. 6 illustrates a faucet assembly 100f substantially the same as the faucet assembly 100d (FIG. 4), but without the UV reflective surface 230 or UV transmissive surface 240 in the water supply 110. This construction implements a pre-faucet disinfecting strategy that includes the UV bulb 210. This construction implements the same in-faucet stagnation disinfecting strategy as in the faucet assembly 100d (FIG. 4) (i.e., antimicrobial tubing 310 stopping short of the tip 140 and one or more UV LEDs 220 in the zone between the antimicrobial tubing 310 and tip). The antimicrobial tubing 310 and UV LEDs 220 kill bacteria in any water that stagnates in the spout 120 during standby. The distal end of the antimicrobial tube 310 is supported by a guiding tool 510.

Figure 7:
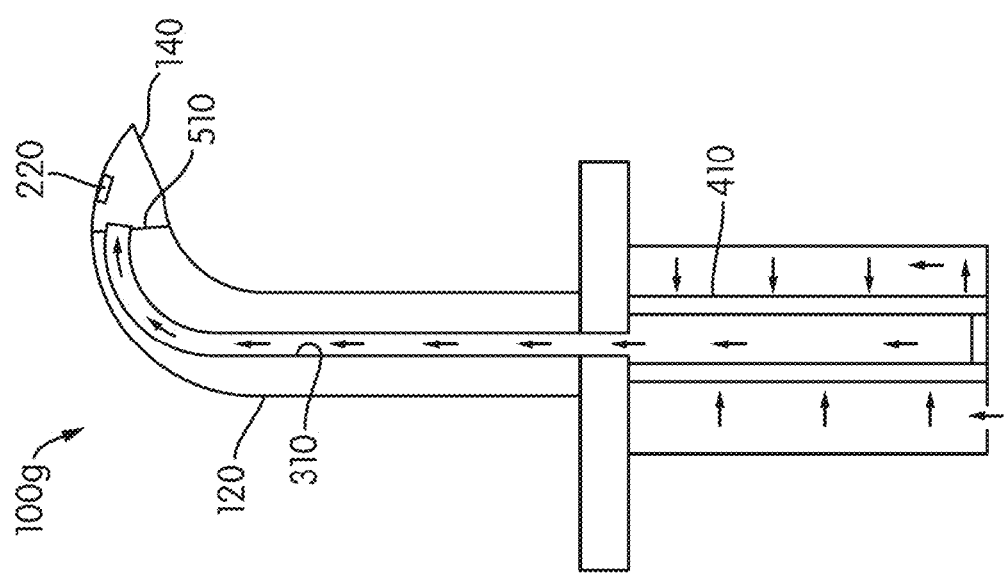
FIG. 7 illustrates a seventh construction of a faucet according to the present invention.

FIG. 7 illustrates a faucet assembly 100g that implements a pre-faucet disinfecting strategy that includes a MF or UF filter 410, that may be in the form of a plurality of straws or a column, through which water flows to physically separate bacteria from the water prior to entering the spout 120. This construction implements the same in-faucet stagnation disinfecting strategy as in the faucet assemblies 100d, 100f (FIGS. 4 and 6) (i.e., antimicrobial tubing 310 stopping short of the tip 140 and one or more UV LEDs 220 in the zone between the antimicrobial tubing 310 and tip). The antimicrobial tubing 310 and UV LEDs 220 kill bacteria in any water that stagnates in the spout 120 during standby. The distal end of the antimicrobial tube 310 is supported by the guiding tool 510.

Figure 8:
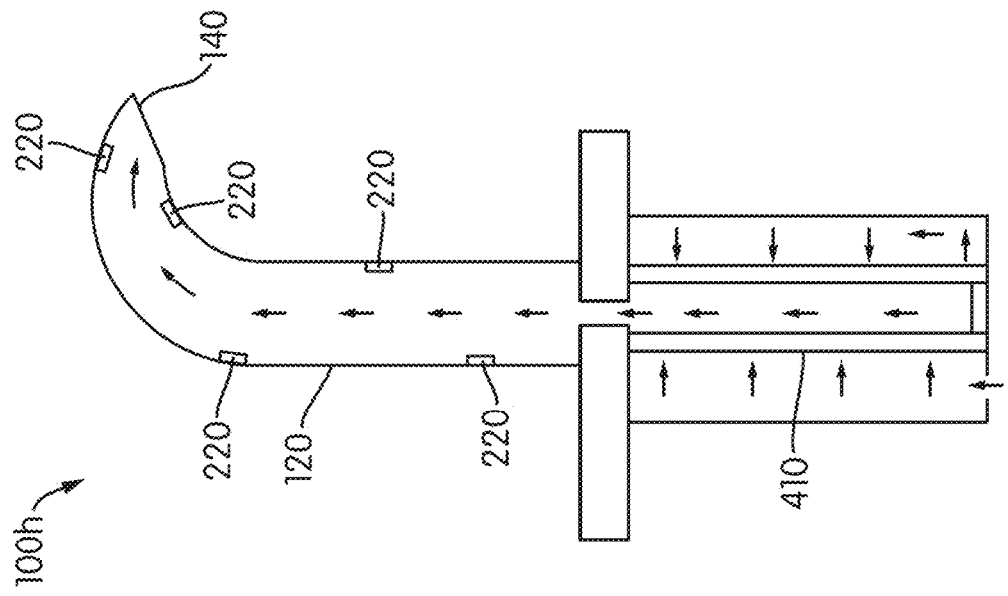
FIG. 8 illustrates an eighth construction of a faucet according to the present invention.

FIG. 8 illustrates a faucet assembly 100h that implements the same pre-faucet disinfecting strategy as the faucet assembly 100g (FIG. 7) (i.e., MF or UF filter 410), and implements an in-faucet stagnation disinfecting strategy like the faucet assembly 100a (FIG. 1) (multiple UV LEDs throughout the spout 120 including at the tip 140).

Figure 9:
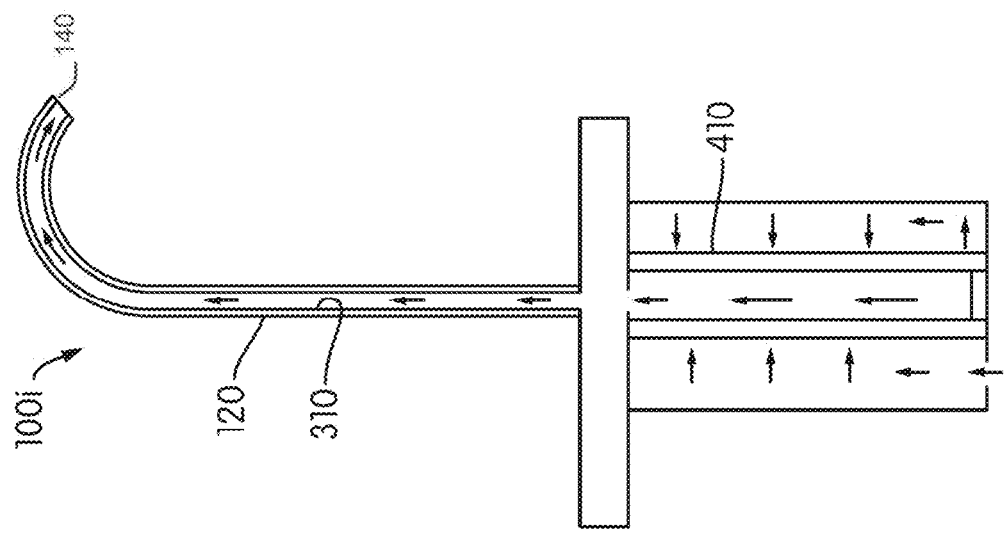
FIG. 9 illustrates a ninth construction of a faucet according to the present invention.

FIG. 9 illustrates a faucet assembly 100i that implements the same pre-faucet disinfecting strategy as in the faucet assembly 100h (FIG. 8) (i.e., MF or UF filter 410) and implements an in-faucet stagnation disinfection strategy that includes antimicrobial tubing 310 of sufficient stiffness formed in the spout 120. In this regard, the antimicrobial tubing 310 by definition extends all the way to the tip 140 of the spout 120.

Figure 10:
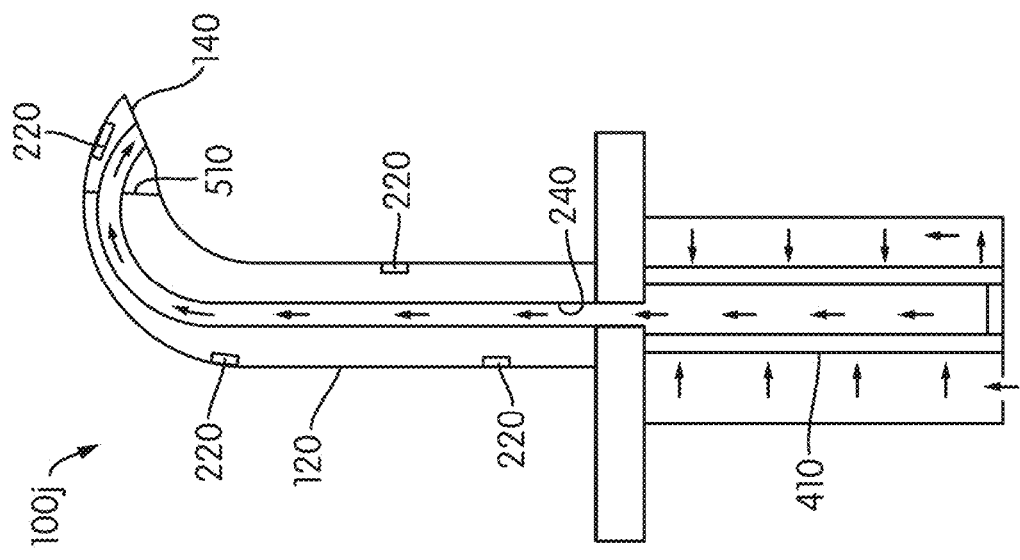
FIG. 10 illustrates a tenth construction of a faucet according to the present invention.

FIG. 10 illustrates a faucet assembly 100j that implements the same pre-faucet disinfecting strategy as in the faucet assembly 100h (FIG. 8) (i.e., MF or UF filter 410) and implements the same in-faucet stagnation disinfection strategy as in the faucet assembly 100b (FIG. 2) (a UV transmissive tube 240 and a plurality of UV LEDs throughout the spout 120 including at the tip 140). As in the construction in FIG. 2, the guiding tool 510 holds the UV transmissive tube 240 in a desired position within the spout 120. Although not illustrated, this construction may include a lining of UV reflective material 230 in the spout 120 to improve irradiation with the UV LEDs 220.

Figure 11:
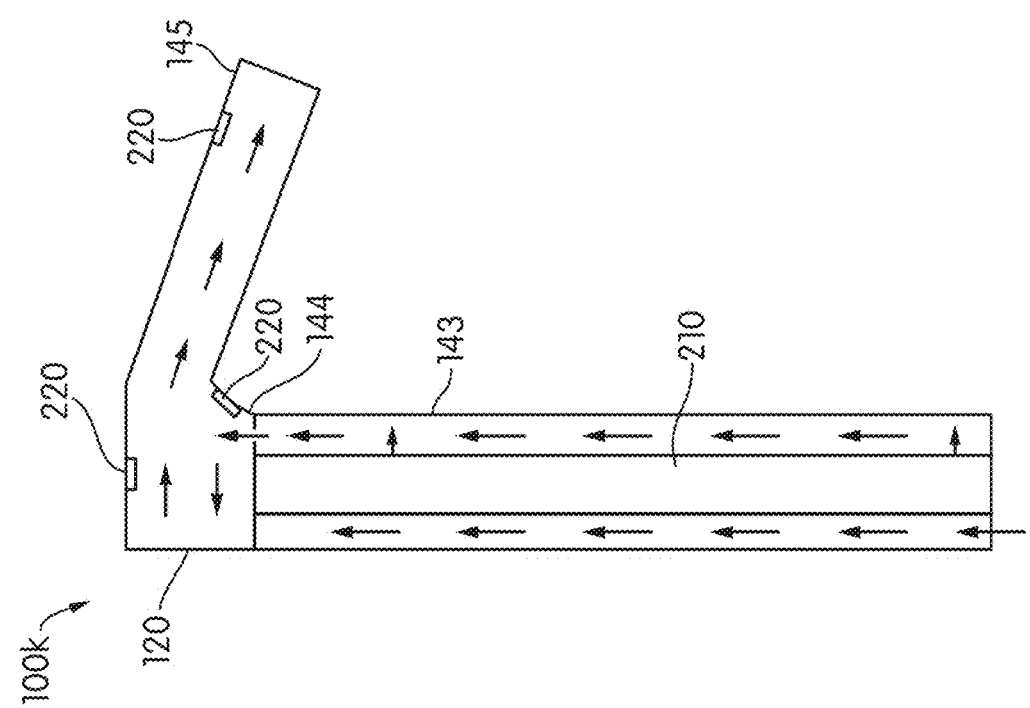
FIG. 11 illustrates an eleventh construction of a faucet according to the present invention.

FIG. 11 illustrates a faucet assembly 100k that implements an in-faucet flow disinfecting strategy that includes the UV bulb 210 centered in the vertical rise 143 of the spout 120. The vertical rise 143 of the spout 120 and the UV bulb 210 define an annular space between them through which the water flows. As the water flows around the UV bulb 210, the UV bulb 210 irradiates any bacteria in the flowing water with UV light to kill the bacteria. This faucet assembly 100k implements an in-faucet stagnation disinfection strategy of positioning UV LEDs 220 throughout the curved portion 144 and dispensing portion 145 of the spout 120. The UV LEDs 220 may be strategically positioned to irradiate portions of the spout 120 where water may stagnate during standby.

Figure 12:
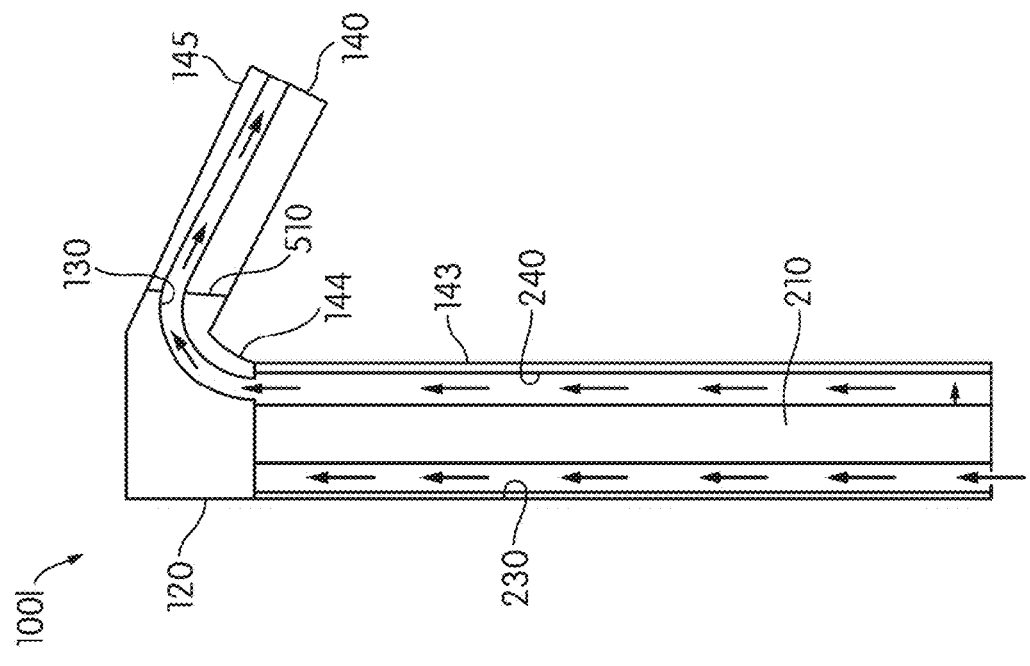
FIG. 12 illustrates a twelfth construction of a faucet according to the present invention.

FIG. 12 illustrates a faucet assembly 100l that implements an in-faucet flow disinfecting strategy that includes the UV bulb 210 centered in the vertical rise 143 of the spout 120 and UV reflective material 230 lining in the vertical rise 143 to improve the effectiveness of the UV bulb 210. UV transmissive material 240 may coat the UV reflective material 230 if necessary. This construction implements an in-faucet stagnation disinfecting strategy with antimicrobial tube 310 in the curved portion 144 and dispensing portion 145 of the spout 120. The antimicrobial tube 310 communicates at one end with the annual space around the UV bulb 210. The antimicrobial tube 310 extends all the way to the tip 140 of the spout 120. The antimicrobial tube 310 is supported by the guiding tool 510. During standby, the water sits or stagnates in the antimicrobial tubing 310 such that bacteria in the antimicrobial tubing 310 is killed by the antimicrobial material 310.

FIG. 13 illustrates a faucet assembly 100m that implements the same in-faucet flow disinfecting strategy as in the faucet assembly 100k (FIG. 11) (the UV bulb 210 centered in the vertical rise 143 of the spout 120). This construction also implements in-faucet stagnation disinfecting with the UV LEDs 220 throughout the curved portion 144 and dispensing portion 145 of the spout 120. In this construction, UV transmissive material 240 in the form of a UV transmissive tube communicates at one end with the annual space around the UV bulb 210. The UV transmissive tube 240 extends from the top of the rise 143 of the spout 120 to the tip 140 of the spout 120. During standby, the water sits or stagnates in the UV transmissive tube 240 while being irradiated with UV light from the UV LEDs 220. The guiding tool 510 holds the UV transmissive tube 240 in a desired position within the spout 120. Although not illustrated, this construction may include a lining of UV reflective material 230 in the spout 120 to improve irradiation with the UV LEDs 220.

FIG. 14 illustrates a faucet assembly 100n that implements the same in-faucet flow disinfecting strategy as in the faucet assembly 100l (FIG. 12) (i.e., a centered UV bulb 210 in the vertical rise 143 of the spout 120 with a liner of UV reflective material 230 and protective UV transmissive coating 240 if necessary). This construction also includes antimicrobial tubing 310 communicating at one end with the annual space around the UV bulb 210 at the top of the rise 143. The antimicrobial tubing 310 does not extend all the way to the tip 140 of the spout 120, but does extend across the curved portion 144 to the dispensing portion 145. The distal end of the antimicrobial tube 310 is supported in the dispensing portion 145 by the guiding tool 510. In the zone between the end of the antimicrobial tubing 310 and the tip 140 of the spout 120 (i.e., in the dispensing portion 145), one or more UV LEDs 220 are positioned to kill bacteria in any water that stagnates there.

Figure 15:
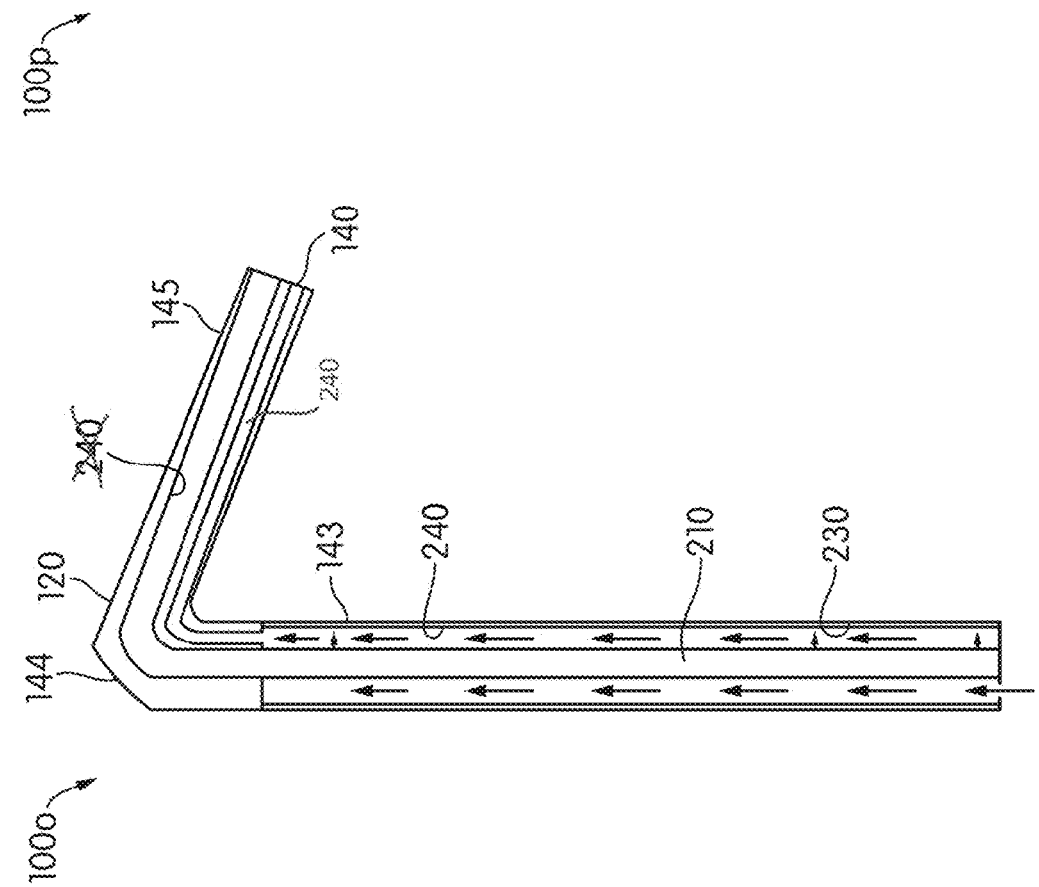
FIG. 15 illustrates a fifteenth construction of a faucet according to the present invention.

FIG. 15 illustrates a construction in which a faucet assembly 100o includes the UV bulb 210 bent to follow the shape of the spout 120. More specifically, the UV bulb 210 includes a vertical rise portion in the vertical rise 143 of the spout 120, a curved portion in the curved portion 144 of the spout 120, and a dispensing portion in the dispensing portion 145 of the spout 120. In this construction, the UV bulb 210 is centered in all portions of the spout 120. The vertical rise portion 143 of the spout 120 is lined with UV reflective material 230 to enhance the effectiveness of the UV bulb 210. The UV reflective material 230 is coated, if necessary, with UV transmissive material 240 to prevent contact between water and the UV reflective material 230. A tube of UV transmissive material 240 communicates between the annular space around the UV bulb 210 in the vertical rise portion 143 and the tip 140 of the spout 120. The UV transmissive tube 240 bends through the curved portion 144 of the spout 120 and extends the entire length of the dispensing portion 145. In the curved portion 143 and dispensing portion 144, the water is disinfected with UV light from the UV bulb 210 through the wall of the UV transmissive tube 240. The in-faucet flow disinfecting strategy for this construction includes the UV bulb 210 and the UV reflective material 230. The in-faucet stagnation disinfecting strategy for this construction includes the UV bulb 210 and the UV transmissive tube 240.

Figure 16:
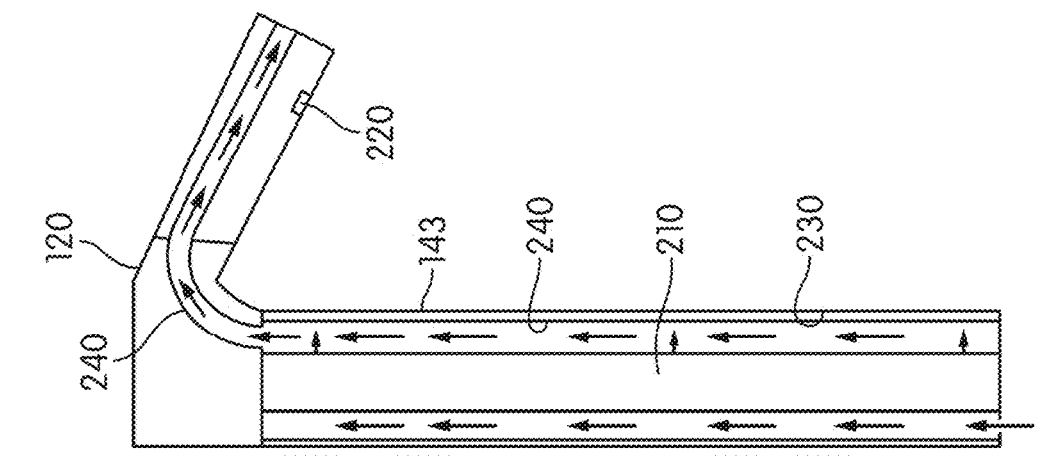
FIG. 16 illustrates a sixteenth construction of a faucet according to the present invention.

FIG. 16 illustrates a faucet assembly 100p identical to that in the faucet assembly 100m (FIG. 13), but with a liner of UV reflective material 230 in the vertical rise 143 of the spout 120. UV transmissive coating 240 may be applied over the UV reflective material 230 if necessary. All observations about the faucet assembly 100m (FIG. 13) applies to faucet assembly 100p except that the effectiveness of the UV bulb 210 is enhanced by the UV reflective material 230 in the construction of FIG. 16.

Figure 17:
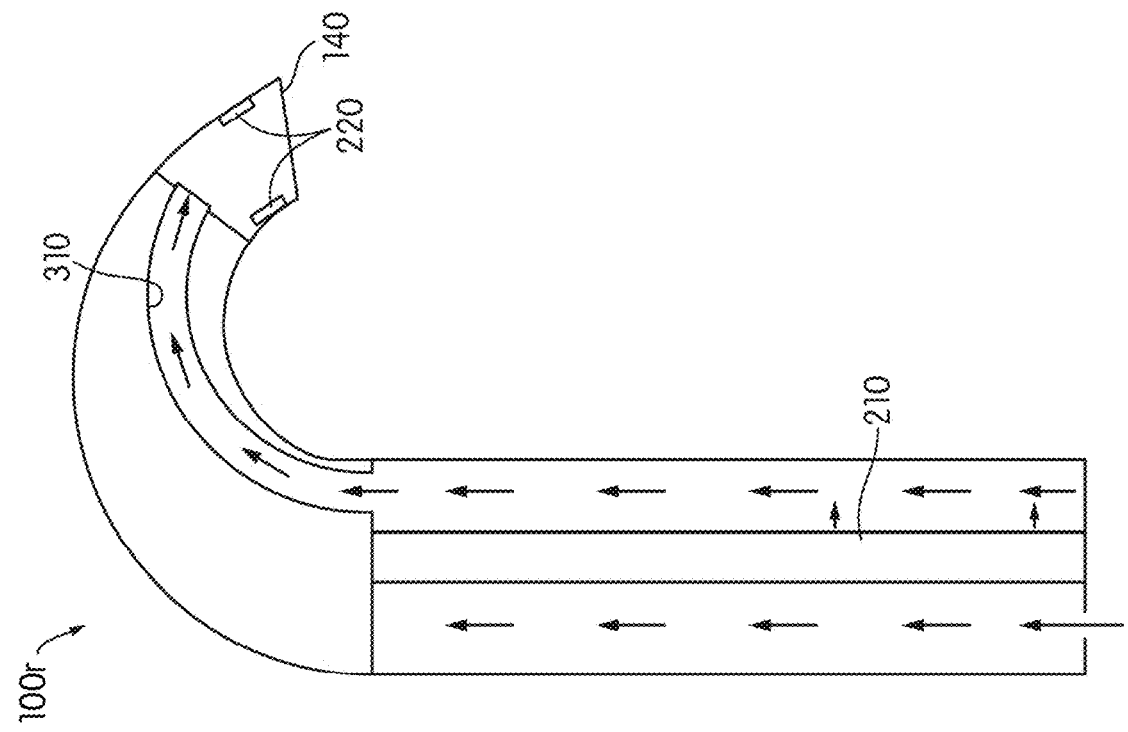
FIG. 17 illustrates a seventeenth construction of a faucet according to the present invention.

FIG. 17 illustrates a faucet assembly 100q implementing an in-faucet flow disinfecting strategy that includes the UV bulb 210 centered in the vertical rise 143 of the spout 120 and an in-faucet stagnation disinfection strategy that includes an antimicrobial tube 310 in the curved portion 144 and dispensing portion 145 of the spout 120. The antimicrobial tube 310 communicates at one end with the annular space around the UV bulb 210 and extends all the way to the tip 140 of the spout 120.

Figure 18:
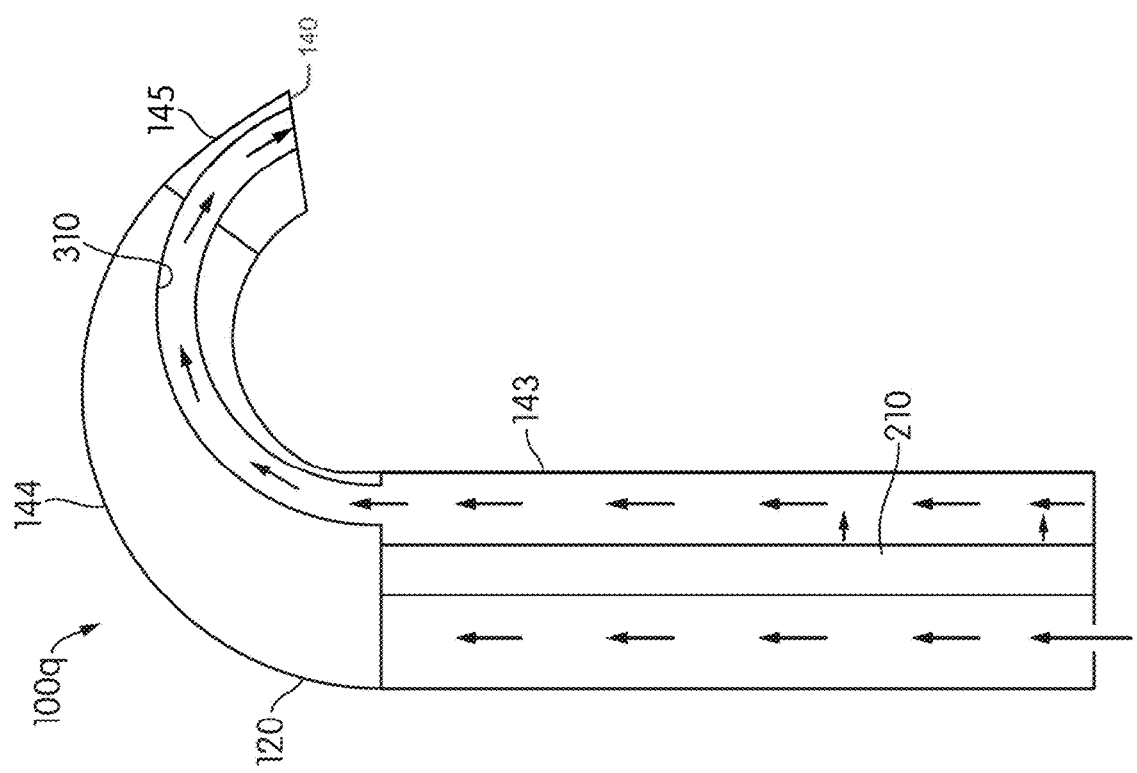
FIG. 18 illustrates an eighteenth construction of a faucet according to the present invention.

FIG. 18 illustrates a faucet assembly 100r equivalent to the faucet assembly 100q (FIG. 17), except that the antimicrobial tube 310 does not extend all the way to the tip 140, and the zone between the end of the antimicrobial tube 310 and the tip 140 is fitted with LEDs 220 as part of the in-faucet stagnation disinfection strategy.

FIG. 19 illustrates a faucet assembly 100s that implements in-faucet flow disinfection strategy with LEDs 220 throughout the spout 120, in combination with UV reflective and transmissive materials 230, 240 in the vertical rise 143 and an optional heat sink 610 in the vertical rise 143. The heat sink 610 in this construction is attached to the UV-LED chip 220 to dissipate heat generated during operation. The surface area of the heat sink 610 is pre-determined by the power and number of UV-LED chips. Preferably, aluminum, or an alloy of aluminum, shall be used as the heat sink material and the surface shall be polished to further increase the reflectivity of UVC. It should be understood that a heat sink similar to the heat sink 610 can be used with any construction described in this disclosure that includes a UV-LED chip 220. This construction implements an in-faucet stagnation disinfection strategy with UV LEDs 220 and UV transmissive tube 240 in the curved and dispensing portions 144, 145. The curved and dispensing portions 144, 145 may be lined with UV reflective material 230 to enhance the UV light of the UV LEDs 220.

FIG. 20 illustrates a faucet assembly 100t with the same in-faucet flow disinfection strategy as the faucet assembly 100s (FIG. 19) but without the heat sink 610. This construction implements in-faucet stagnation disinfection with the antimicrobial tube 310 in the curved and dispensing portions 144, 145.

FIG. 21 illustrates a faucet assembly 100u similar to the faucet assembly 100t (FIG. 20), except the antimicrobial tube 310 does not extend all the way to the tip 140. The zone between the antimicrobial tube 310 and the tip 140 includes UV LEDs 220 for additional in-faucet stagnation disinfection.

Figure 22:
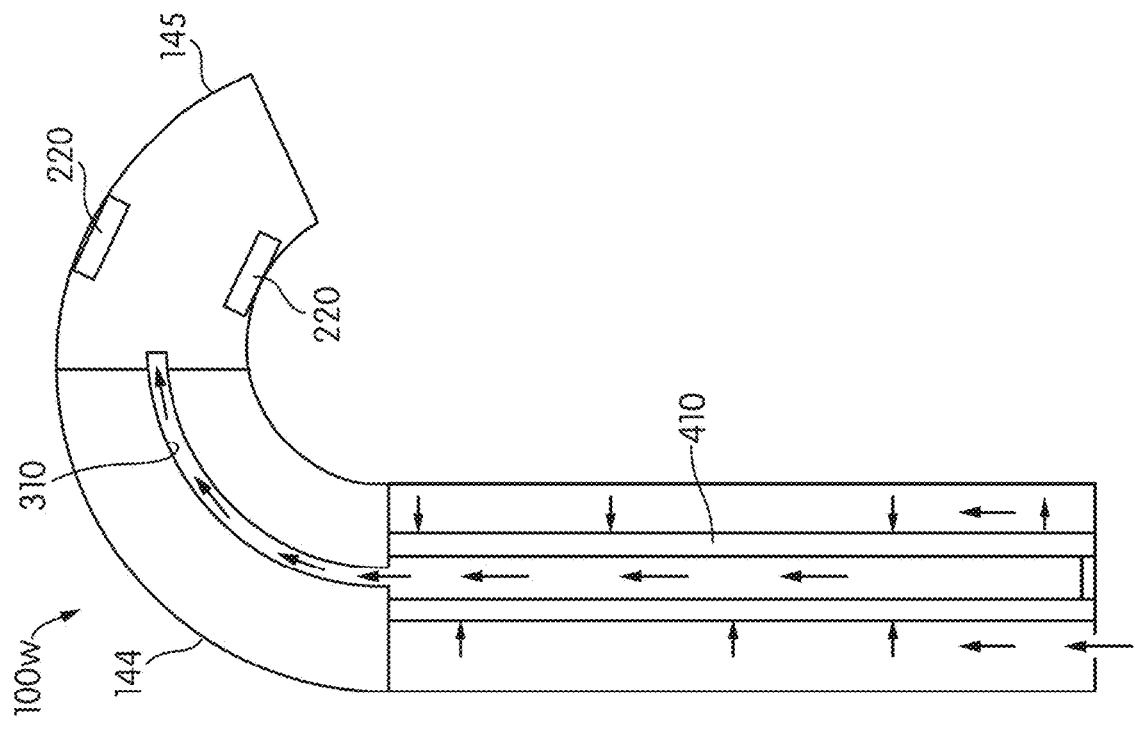
FIG. 22 illustrates a twenty-second construction of a faucet according to the present invention.

FIG. 22 illustrates a faucet assembly 100v including the MF or UF filter 410 (e.g., a filter cylinder or multiple straws) in the rise 143 of the spout 120. This construction implements in-faucet flow disinfection strategy while UV transmissive tube 240 and a plurality of UV LEDs 220 in the curved and dispensing portions 144, 145 provide in-filter stagnation disinfection. Although not illustrated, UV reflective material 230 may be used to line the spout 120 to enhance the effectiveness of the UV LEDS 220.

Figure 23:
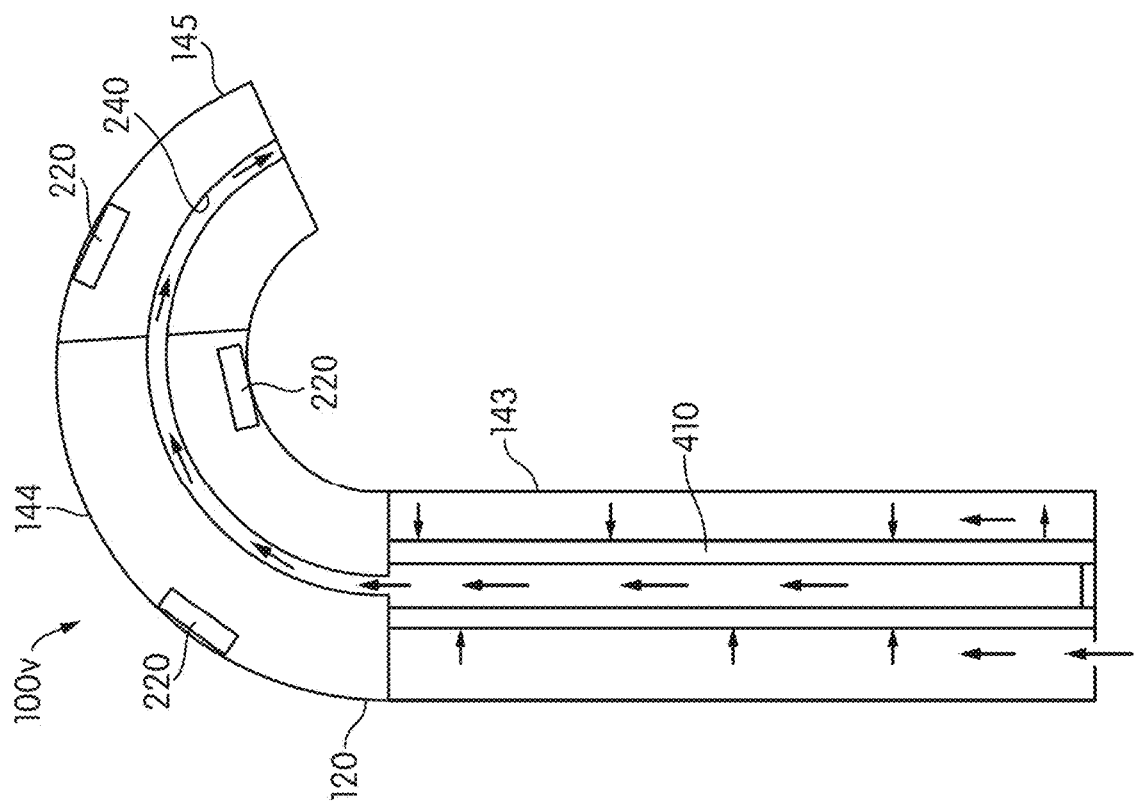
FIG. 23 illustrates a twenty-third construction of a faucet according to the present invention.

FIG. 23 illustrates a faucet assembly 100w using the same in-faucet flow disinfection strategy as the faucet assembly 100v (FIG. 22), but implements in-faucet stagnation disinfection with antimicrobial tube 310 in the curved portion 144 and multiple UV LEDs in the dispensing portion 145.

Figure 24:
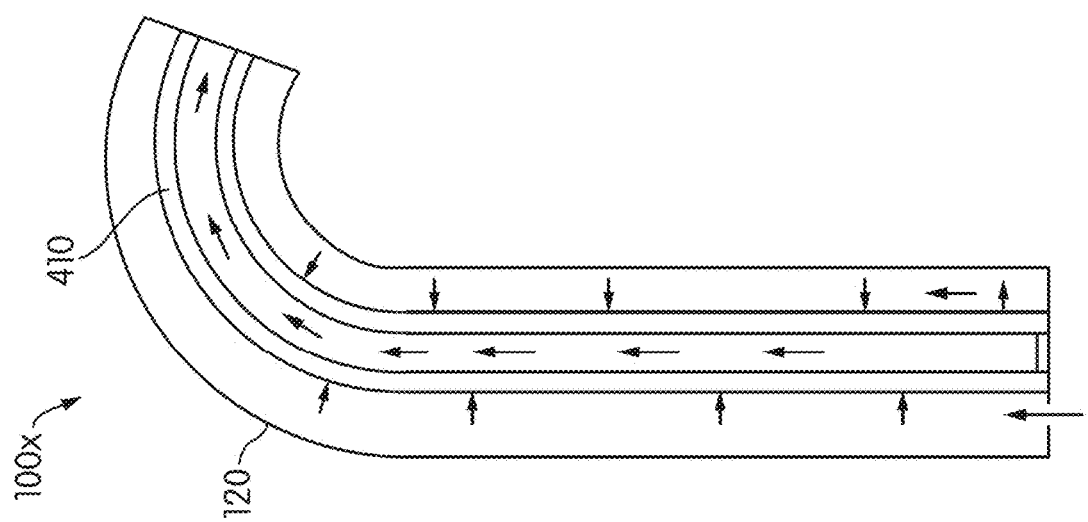
FIG. 24 illustrates a twenty-fourth construction of a faucet according to the present invention.

FIG. 24 illustrates a faucet assembly 100x in which the MF or UF filter 410 extends the entire length of the spout 120 for in-faucet flow disinfection. The in-faucet stagnation disinfection strategy for this construction arises from the MF or UF filter 410 extending all the way to the tip 140 of the spout 120, which may reduce the biofilm growth on the faucet surface and filter out airborne bacteria by mechanical filtration.

Figure 25:
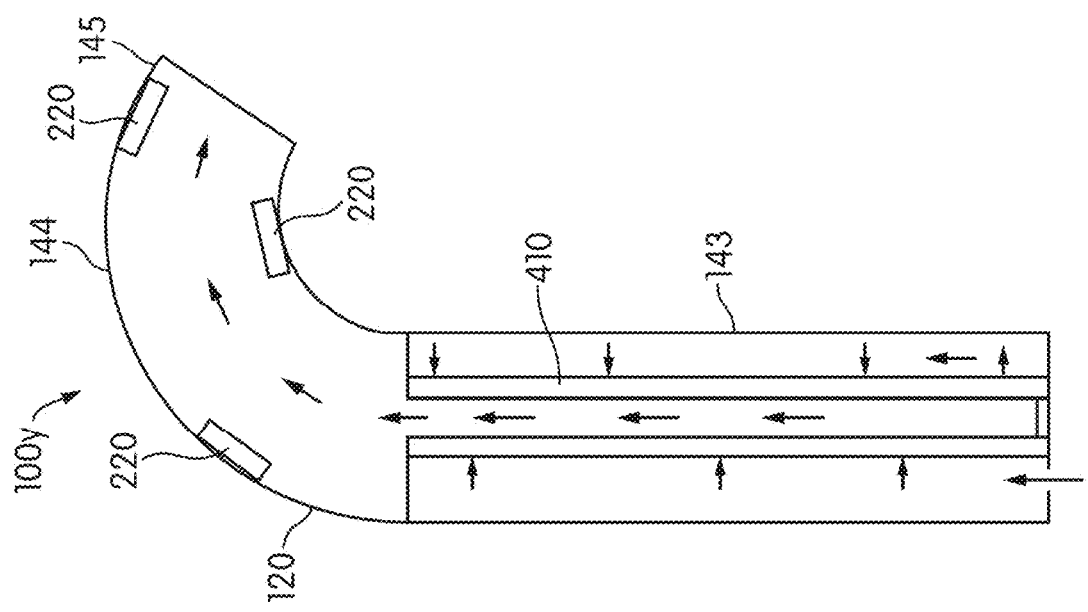
FIG. 25 illustrates a twenty-fifth construction of a faucet according to the present invention.

FIG. 25 illustrates a faucet assembly 100y in which in-faucet flow disinfection is accomplished with the MF or UF filter 410 in the rise portion 143 and in-faucet stagnation disinfection is accomplished with UV LEDs 220 in the curved and dispensing portions 144, 145. Although not illustrated, UV reflective material 230 may be used to line the spout 120 to enhance the effectiveness of the UV LEDs 220.

Figure 26:
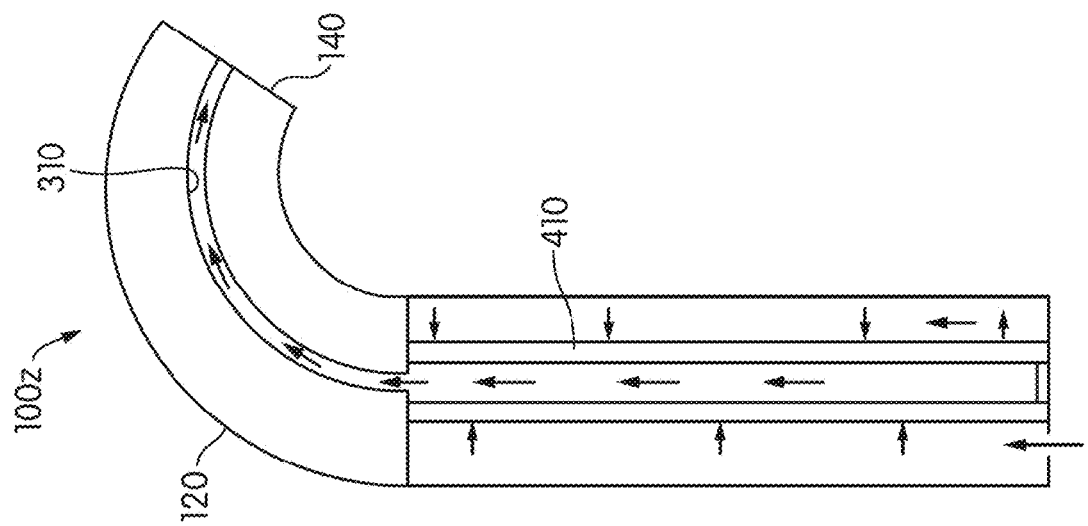
FIG. 26 illustrates a twenty-sixth construction of a faucet according to the present invention.

FIG. 26 illustrates a faucet assembly 100z in which in-faucet flow disinfection is the same as in the faucet assembly 100y (FIG. 25) and in-faucet stagnation disinfection is accomplished with antimicrobial tubing 310 extending from the MF or UF filter 410 all the way to the tip 140 of the spout 120.

Various features of the invention are set forth in the following claims.

What is claimed is:

1. A water dispensing unit, the water dispensing unit comprising:
    a water supply;
    a spout configured to receive water from the water supply and dispense the water to a receptacle for consumption, wherein the water supply includes water received from a municipal water supply and contained within a space directly upstream of a base of the spout, wherein a flow of water from the water supply and into the spout via the base is a downstream water flow;
    a first disinfecting mechanism operable to disinfect water in the water supply; and
    a second disinfecting mechanism operable to disinfect water in the spout,
    wherein the second disinfecting mechanism includes an antimicrobial tube through which water flows, and
    wherein the antimicrobial tube includes a reflective material covering the tube, and a light window configured to receive an ultraviolet (UV) light emitting diode (LED).

2. The water dispensing unit of claim 1, wherein the second disinfecting mechanism disinfects water flowing through a portion of the water dispensing unit.

3. The water dispensing unit of claim 1, wherein the first disinfecting mechanism disinfects water standing in a portion of the water dispensing unit.

4. The water dispensing unit of claim 1, wherein the first disinfecting mechanism includes at least one of an ultraviolet light, an antimicrobial apparatus, or a filtering apparatus.

5. The water dispensing unit of claim 1, the first disinfecting mechanism includes a source of UV light.

6. The water dispensing unit of claim 5, wherein the source of UV light is at least one of a UV LED or a UV bulb.

7. The water dispensing unit of claim 5, wherein the first disinfecting mechanism includes a UV reflective surface.

8. The water dispensing unit of claim 7, further comprising a UV transmissive coating over the UV reflective surface to prevent water from contacting the UV reflective surface.

9. The water dispensing unit of claim 1, wherein the antimicrobial tube extends through at least a portion of the spout.

10. The water dispensing unit of claim 1, wherein the first disinfecting mechanism includes at least one of a microfiltration filter or an ultrafiltration filter.

11. The water dispensing unit of claim 1, further comprising a guiding tool positioned on a distal end of the spout, wherein the guiding tool is configured to support the second disinfecting mechanism.

12. The water dispensing unit of claim 1, wherein the spout includes
    a vertical rise,
    a curved portion configured to turn the water flow from a vertical direction to a non-vertical direction, and
    a dispensing portion having a tip.

13. The water dispensing unit of claim 12, further comprising an annular space formed adjacent the vertical rise, wherein the annular space is configured to define a flow path.

14. The water dispensing unit of claim 1, wherein the first disinfecting mechanism includes a UV bulb.

15. The water dispensing unit of claim 14, wherein the first disinfecting mechanism further includes a UV-reflective structure and a UV-transmissive structure layered on the UV-reflective structure as a barrier between the UV-reflective structure and water in the water supply.

16. The water dispensing unit of claim 15, wherein the second disinfecting mechanism includes the UV LED located at a dispensing tip of the spout.

17. The water dispensing unit of claim 15, wherein the spout extends from a base to a tip, and wherein the antimicrobial tube is a UV-transmissive tube extending through the length of the spout from the base of the spout to the tip of the spout.

* * * * *